(12) United States Patent
Nothe

(10) Patent No.: US 8,895,885 B2
(45) Date of Patent: Nov. 25, 2014

(54) WIRE ELECTRODE FOR SPARK-EROSION CUTTING

(75) Inventor: Tobias Nothe, Herborn (DE)

(73) Assignee: Berkenhoff GmbH (DE)

( * ) Notice: Subject to any disclaimer, the term of this patent is extended or adjusted under 35 U.S.C. 154(b) by 615 days.

(21) Appl. No.: 13/073,541

(22) Filed: Mar. 28, 2011

(65) Prior Publication Data

US 2011/0226743 A1    Sep. 22, 2011

Related U.S. Application Data

(63) Continuation of application No. PCT/EP2009/006148, filed on Aug. 25, 2009.

(30) Foreign Application Priority Data

Oct. 1, 2008  (EP) ..................................... 08165663

(51) Int. Cl.
  *B23H 7/08*   (2006.01)

(52) U.S. Cl.
  CPC ........................................ *B23H 7/08* (2013.01)
  USPC ........................................ 219/69.12; 428/650

(58) Field of Classification Search
  USPC ................... 219/69.12, 69.15; 427/607, 650; 428/607, 650
  See application file for complete search history.

(56) References Cited

U.S. PATENT DOCUMENTS

| | | | |
|---|---|---|---|
| 4,686,153 A * | 8/1987 | Tominaga et al. ......... | 219/69.12 |
| 4,713,216 A * | 12/1987 | Higashi et al. ................. | 420/532 |
| 4,837,416 A * | 6/1989 | Yamamoto et al. ........ | 219/69.12 |
| 4,935,594 A * | 6/1990 | Groos et al. ................ | 219/69.12 |
| 4,968,867 A * | 11/1990 | Banzai et al. .............. | 219/69.12 |
| 4,977,303 A | 12/1990 | Briffod | |
| 5,721,414 A * | 2/1998 | Lacourcelle ................ | 219/69.12 |
| 5,762,726 A | 6/1998 | Barthel et al. | |
| 5,808,262 A | 9/1998 | Mukherjee | |
| 5,945,010 A | 8/1999 | Tomalin | |
| 6,176,994 B1 | 1/2001 | Lacourcelle | |
| 6,447,930 B2 | 9/2002 | Barthel et al. | |
| 6,566,622 B1 * | 5/2003 | Barthel et al. ............. | 219/69.12 |
| 6,676,899 B2 * | 1/2004 | Davydov et al. ............... | 420/532 |

(Continued)

FOREIGN PATENT DOCUMENTS

| DE | 19510740 A1 | 10/1996 |
|---|---|---|
| EP | 0733431 A1 | 9/1996 |

(Continued)

OTHER PUBLICATIONS

"European Application Serial No. EP08165663, European Search Report dated Nov. 7, 2008", 3 pgs.

(Continued)

*Primary Examiner* — Geoffrey S Evans
(74) *Attorney, Agent, or Firm* — Schwegman Lundberg & Woessner, P.A.

(57) ABSTRACT

The invention relates to a wire electrode for spark-erosion cutting. The wire electrode comprises a core made of more than 50% by weight pure crystalline aluminum and/or one or more crystalline aluminum alloys, and comprises a coating layer encompassing the core and comprising copper, zinc, and/or a copper-zinc alloy. The proportion of the surface area of the core relative to the total cross-sectional area of the wire electrode is in the range from 60% to 95% along the entire length of the wire electrode.

12 Claims, 1 Drawing Sheet

(56) References Cited

U.S. PATENT DOCUMENTS

| | | | |
|---|---|---|---|
| 6,781,081 | B2 | 8/2004 | Groos et al. |
| 6,794,597 | B2 | 9/2004 | Groos et al. |
| 8,378,247 | B2 | 2/2013 | Blanc et al. |
| 2002/0195427 | A1* | 12/2002 | Miyoshi ............... 219/69.12 |
| 2003/0057189 | A1* | 3/2003 | Groos et al. ............ 219/69.12 |
| 2005/0040141 | A1 | 2/2005 | Ly |
| 2006/0219666 | A1 | 10/2006 | Shin |
| 2008/0061038 | A1 | 3/2008 | Blanc et al. |
| 2008/0179296 | A1 | 7/2008 | Ly et al. |
| 2009/0025959 | A1* | 1/2009 | Tomalin ................ 174/126.2 |
| 2011/0290531 | A1 | 12/2011 | Baumann et al. |

FOREIGN PATENT DOCUMENTS

| | | |
|---|---|---|
| EP | 0733431 B1 | 9/1996 |
| EP | 0734805 A1 | 10/1996 |
| EP | 0955396 A1 | 11/1999 |
| EP | 1038625 A2 | 9/2000 |
| EP | 1295664 A1 | 3/2003 |
| EP | 1295663 B1 | 5/2007 |
| EP | 1949995 A1 | 7/2008 |
| EP | 2193867 B1 | 6/2012 |
| FR | 2881974 A1 | 8/2006 |
| JP | 5-337741 A1 | 12/1993 |
| JP | 2002-126949 A | 5/2002 |
| JP | 2005-254408 A | 9/2005 |
| WO | WO-2006/085006 A1 | 8/2006 |

OTHER PUBLICATIONS

"International Application Serial No. PCT/EP2009/006148, International Search Report mailed Nov. 5, 2009", 4 pgs.

"International Application Seriai No. PCT/EP2009/006148, Written Opinion mailed Nov. 5, 2009", (w/ English Translation), 8 pgs.

"U.S. Appl. No. 13/132,291, Non Final Office Action mailed Aug. 1, 2013", 7 pgs.

"U.S. Appl. No. 13/132,291, Response filed Dec. 2, 2013 to Non Final Office Action mailed Aug. 1, 2013", 14 pgs.

"International Application Serial No. PCT/EP2009/008435, International Search Report mailed May 6, 2010", (w/ English Translation), 6 pgs.

"Joint de grain", [online]. Wikipedia®. [retrieved on Mar. 19, 2013]. Retrieved from the Internet: <URL: http://fr.wikipedia.org/wiki/Joint_de_grain>, (w/ English Translation), (2013), 2 pgs.

"Client Summary", Exhibit D9 to Opecmade's Notice of Opposition, (Mar. 20, 2013), 9 pgs.

"Declaration of Michel Ly", (Mar 18, 2013), 1 pg.

"European Application Serial No. EP08170563.4, Euopean Search Report mailed May 20, 2009", 8 pgs.

"European Application Serial No. EP08170563.4, Request for Amendment filed Apr. 3, 2012", 2 pgs.

"European Application Serial No. EP08170563.4, Response filed Dec. 8, 2010", 21 pgs.

"Grain boundary", [online]. Wikipedia(r), the free encyclopedia. Retrieved from the Internet: <URL: http://en.wikipedia.org/wiki/Grain_boundary> (last modified on Dec. 5, 2013), (2013), 5 pgs.

"Machine Translation of JP 2005-254408A, published Sep. 22, 2005", 30 pgs.

"Notice of Opposition filed Mar. 19, 2013 by Heinrich Stamm GmbH", 12 pgs.

"Notices of Opposition filed Mar. 20, 2013 by Opecmade, Inc., EDM, Mart Co., Ltd. and Therrnocompact", (w/ Partial English Translation), 70 pgs.

"Reply of Berkenhoff GmbH filed Nov. 11, 2013 to Notices of Oppositions", 24 pgs.

"Report—Opposition of EP 2193867B1", (Mar. 19, 2013), 5 pgs.

"Traduction de l'allemand", (Jun. 3, 2008), 13 pgs.

"U.S. Appl. No. 13/132,291, *Ex Parte Quayle* Action mailed May 12, 2014", 4 pgs.

"U.S. Appl. No. 13/132,291, Final Office Action mailed Mar. 11, 2014", 6 pgs.

"U.S. Appl. No. 13/132,291, Notice of Allowance mailed May 28, 2014", 8 pgs.

* cited by examiner

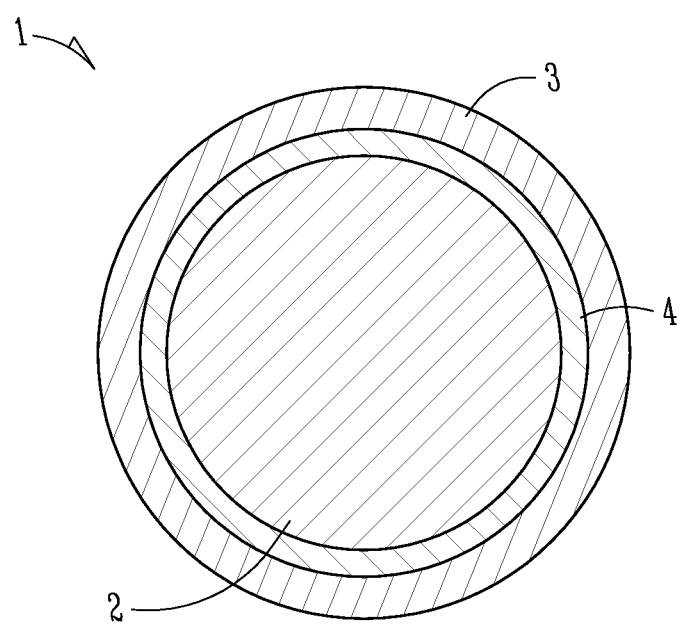

WIRE ELECTRODE FOR SPARK-EROSION CUTTING

RELATED APPLICATIONS

This application is a continuation of International Application Serial Number PCT/EP2009/006148, filed Aug. 25, 2009 and published as WO 2010/037451 A1 on Apr. 8, 2010, and further claims priority to European Patent Application No. 08165663.9, filed Oct. 1, 2008; which applications and publication are incorporated herein by reference in their entirety.

The present invention relates to a wire electrode for cutting by electrical discharge machining, or spark-erosion cutting, having a core of aluminum or an aluminum alloy, and having a covering or coating layer that encompasses the core and that comprises copper, zinc and/or a copper-zinc alloy.

Electrical discharge machining (EDM) methods, or spark-erosion methods, are used for separating electrically conductive workpieces, and are based on the removal of material by means of spark discharges between the workpiece and a tool. For this purpose, in a dielectric liquid such as, for example, deionized water or an oil, controlled spark discharges are produced between the respective workpiece and the tool, which is disposed at a short distance therefrom and which acts as an electrode, through the application of voltage pulses. In this manner, workpieces can be machined substantially irrespective of their hardness.

A special electrical discharge machining method, in which the tool is constituted by a tensioned, thin wire having typical diameters in a range from approximately 0.02 to 0.4 mm, is that of cutting by electrical discharge machining (spark-erosive cutting) or wire erosion. Since the wire wears during the eroding process as a result of the removal of material, it has to be continuously drawn through the cutting, or machining, zone and can only be used once, i.e. the wire is consumed continuously.

In practice, coated or uncoated wire electrodes are used, depending on the application. Uncoated wire electrodes, which are also referred to as bare or blank wires, are composed of a homogeneous material, while coated wire electrodes have a covered, or coated, core. In the prior art, coated wire electrodes are normally constructed such that the core of the wire electrode imparts the tensile strength, necessary for the through-passage of the wire and for the wire tensioning, and the necessary electrical and thermal conductivity to the wire electrode, and a covering or coating layer that encompasses the core is responsible for the actual erosion process.

Coated wire electrodes having a core material of very high tensile strength, such as, for example, tungsten, molybdenum or steel, have become established in the range of small wire diameters of from 0.02 to 0.07 mm, since only in this way is it possible to realize a wire tensioning necessary for a stable eroding process and for the required precision. For greater wire diameters, however, wires having cores of tungsten or molybdenum do not constitute an economic solution.

The majority of the wires used in practice have diameters that are in the range from 0.1 to 0.3 mm, since the structural specifications in respect of the geometry of the component to be produced can normally be fulfilled thereby. In this standard diameter range, bare and coated brass-based wires have been generally adopted. The corresponding bare wires are typically composed of brass having a zinc content of between 35 and 40% by weight, while most coated wires have a core of copper or brass and have one or more covering layers of zinc or copper or a copper-zinc alloy. It has been found that such wires can be produced with a tensile strength and wear resistance that are sufficient to fulfill the usually stipulated requirements for component precision. Their tensile strength at room temperature is usually in the range from approximately 350 to 1100 $N/mm^2$. Moreover, these wires have a sufficiently high electrical conductivity to ensure an efficient transfer of energy from the pulse generator of the eroding machine to the workpiece. As a core material, copper or brass further have the advantage that they can be processed economically through cold forming, and, as materials involved in the actual eroding process, zinc and brass, owing to the presence of zinc and the ease of vaporization resulting therefrom, offer the advantages of a relatively high removal rate and efficiency of the eroding process and the possibility of the transfer of very small pulse energies for the fine finishing of workpiece surfaces.

Against this background, in the past—driven, to a considerable extent, by innovations in machine engineering and, in particular, by the increase in the performance of the process energy sources—a multiplicity of bare and coated wires were developed, which were directed toward increasing the removal rate and/or improving the workpiece quality. For example, an aim of these developments consisted in combining a high tensile strength with a high electrical and thermal conductivity. In the course of these developments, coated wire electrodes, having cores of materials other than copper or brass, have also been proposed sporadically in the above-mentioned standard diameter range. For example, U.S. Pat. No. 4,968,867 describes a wire electrode whose core material is to have a high thermal conductivity and may be, inter alia, aluminum or an aluminum alloy. In order to achieve the desired tensile strength and mechanical load capability, a covering layer of brass, having a certain minimum thickness, is provided. According to this document, the proportion of the area of the covering layer, in cross-section, must be greater than the proportion of the area of the core, and must be 50 to 90% of the entire cross-sectional area of the wire electrode. Further, good vibration damping of the wire electrode is to be achieved through this structure.

Since the technique of wire eroding that has been used for just under 40 years has now attained a high level of technological maturity, the economic efficiency of the method is also becoming increasingly important, in addition to the aforementioned aims, in order to make the wire eroding technique attractive to the widest possible group of users.

It is the object of the present invention to further develop the wire electrodes of the prior art, having their high removal rates and the short machining times resulting therefrom, in such a way that the economic efficiency of wire eroding is increased further, while maintaining a sufficient tensile strength and good eroding properties.

The features of claim 1 serve to achieve this object. Advantageous embodiments of the wire electrode constitute subject-matter of the respective associated dependent claims.

According to the present invention it is provided that a wire electrode for cutting by electrical discharge machining, or spark-erosion cutting, has a core that is composed of more than 50% by weight of pure crystalline aluminum and/or one or more crystalline aluminum alloys. In the scope of this application, a "crystalline" material means, in the usual manner, both single-crystal materials and polycrystalline materials. Thus, in addition to comprising pure crystalline aluminum and/or one or more crystalline aluminum alloys, the core could comprise, for example, one or more additives, in order to affect certain properties in a favorable manner. It is preferred, however, for the core to be composed entirely or substantially entirely of pure crystalline aluminum and/or one or more crystalline aluminum alloys, i.e. that a core of pure crystalline aluminum and/or one or more crystalline aluminum alloys be provided. In particular, the core can be realized or made entirely of aluminum or of an aluminum alloy. The core can be realized so as to be homogeneous or have properties that vary in the radial direction, for example in the form of a plurality of individual aluminum or aluminum-alloy layers of differing composition.

Surrounding the core is a covering or coating layer, which comprises copper, zinc and/or a copper-zinc alloy. Accordingly, the covering layer can be composed, for example, entirely or substantially entirely of copper, entirely or substantially entirely of zinc, or entirely or substantially entirely of a copper-zinc alloy. As will be explained below, it is also possible for the covering layer to be composed of a plurality of individual layers or sublayers, which are each constructed from the materials mentioned. Preferably, the covering layer is made of at least 50% by weight of copper, zinc and/or a copper-zinc alloy. A possibility would be a homogeneous covering layer, having approximately 50% by weight of copper and approximately 50% by weight of zinc, or having approximately 50% by weight of a copper-zinc alloy. A preferred material for the covering layer is brass, or a copper-zinc alloy having a zinc content of more than 40% by weight. Such a brass comprises β phase, which is brittle, has a relatively low tensile strength and is not easily worked by cold forming, but nevertheless advantageously improves the cutting performance. It is therefore particularly preferred if such a brass is provided at least in the outer region of the covering layer.

The covering layer can be applied to, or deposited on, the core, for example, through appropriate coating methods, if necessary in combination with a heat treatment method. The application of the covering layer can be effected, for example, by physical or electrochemical means and, if necessary, it can be followed by further steps, to reduce the wire diameter. Moreover, it is possible to first realize a wire that has the structure of the core, to dispose this wire in a tubular shaped piece of a material having at least individual elements of the intended covering layer, and then to reduce the diameter of this combination by means of a wire drawing device and thereby to plate the tubular material piece onto the core piece. The tubular material piece can be composed, for example, of copper, and, following the diameter reduction, a zinc layer can first be applied, e.g. electrochemically, and finally a heat treatment can be performed, through which a covering layer, comprising brass, is formed by means of diffusion.

Preferably, the covering layer constitutes the outer surface of the wire electrode, and—with the exception of a transition layer, discussed in greater detail further below, that might be present—no further layers are provided between the core and the covering layer. In certain applications, however, it can also be advantageous to provide one or more further layers on the covering layer and/or between the core and the covering layer.

The covering layer surrounding the core—depending on the application—can both be realized in a closed manner and have cracks or chinks or discontinuities, i.e. the covering layer can cover the core entirely or substantially entirely or, alternatively, only partially.

Along the entire length of the wire electrode, in the cross-section perpendicular to the direction of extension of the wire, the proportion of the area of the core relative to the entire cross-sectional area is at least 60%, preferably at least 65%, more preferably at least 70% and most preferably at least 75%, and preferably maximally 95%. In certain applications, however, it can also be advantageous if this area proportion is maximally 90% or maximally 85%. It is preferred that the wire electrode has a circular cross-section. For particular applications, however, cross-sectional shapes that differ from the circular form can also have potential advantages, such as, for example, rectangular profiles.

It has been found that, with a wire electrode of this design, as compared with already known wires, the economic efficiency of the method is increased considerably through reduction of the specific weight of the wire electrode, and therefore of the weight-based wire consumption per unit of time. Thus, for example, in the case of an aluminum core having an area proportion of 60% and a covering layer of brass, having 37% by weight of zinc ($CuZn_{37}$), the density is approximately 5000 kg/m$^3$, and is therefore approximately 40% below the value for a bare wire made of brass of this composition.

Surprisingly, sufficient tensile strengths, of preferably at least 350 N/mm$^2$ at room temperature, and sufficient thermal and electrical conductivities (e.g. electrical conductivities of more than 15 m/Ωmm$^2$) can nevertheless be realized, in order to enable an efficient, rapid and sufficiently precise eroding process. For example, a substantial disadvantage of the choice of materials having a lower specific weight consists, generally, in that the heating-up of the wire electrode increases while the supply of heat is constant and the wire diameter is the same, and the wire loses tensile strength as a result, such that the risk of a wire rupture is increased. Below the melting point, the change in temperature in a small wire portion $\Delta l_D$ resulting from a quantity of heat introduced into this portion is given by the following formula:

$$\Delta T_D = \frac{Q'_{w,zu}}{\rho_D \cdot A_D \cdot v_D \cdot c_{p,D}} - Q'_{w,ab}$$

wherein $\Delta T_D$ is the temperature difference produced in the wire portion $\Delta l_D$, $Q'_{w,zu}$ is the heat flow supplied to the wire portion $\Delta l_D$ through resistance heating and discharge heat, $\rho_D$ is the density of the wire electrode, $A_D$ is the cross-sectional area of the wire electrode, $v_D$ is the wire run-off speed, $c_{p,D}$ is the specific heat capacity of the wire electrode, and $Q'_{w,ab}$ is the heat flow that is dissipated to the environment through the dielectric, the wire portions outside the erosion region, the wire guides and the electric power supply leads. It can be read therefrom that the increase in temperature is influenced, on the one hand, by the density $\rho_D$ and the specific heat capacity $c_{p,D}$. Since the dissipated heat flow $Q'_{w,ab}$ increases as the thermal conductivity of the wire increases, and the supplied heat flow $Q'_{w,zu}$ increases as the electrical resistance of the wire increases, the increase in temperature is determined, on the other hand, by these two characteristic values of the wire. The present invention is based on the recognition that, of the light materials, it is precisely crystalline aluminum that can compensate the thermo-physical disadvantage of the low density through a high specific heat capacity and a high thermal and electrical conductivity. This advantage is transferred to crystalline aluminum alloys.

Since the removal rate and process stability of aluminum or aluminum alloys as materials directly involved in the erosion process are unsatisfactory, the covering layer has the function of imparting good erosion properties, in the sense of a high process stability and cutting performance, to the wire electrode according to the invention. Since these properties are favorably influenced by the easily vaporized zinc in pure form or bound in an alloy, it is preferred that the covering layer comprises zinc or a copper-zinc alloy, or that the covering layer or a, preferably outer, sublayer thereof be made of zinc or of a copper-zinc alloy or comprises at least 50% by weight thereof.

It must be mentioned that the economic efficiency through reduction of the wire consumption is not easily reduced by means of any reduction in the wire run-off speed, since the wire run-off serves to compensate wear and a reduction in speed therefore increases the risk of wire breakage and reduces the precision of the workpiece. Moreover, it is also not possible to substantially reduce the wire diameter, since the transferable pulse energy, and therefore the removal rate, would be drastically reduced at the same time, owing to the quadratic decrease in the cross-sectional area. Moreover, owing to the requirement for tensile strength, only expensive and heavy metals, such as molybdenum or tungsten, would be possible.

A further advantage of the wire electrode according to the invention consists in that, compared with already known wires, the weight of the reel onto which the wire is wound is reduced, for the same length of wire. As a result, not only is handling simplified during transport and when the reel is being inserted in the wire eroding machine, but the requirements for the dimensioning of the shafts that carry the reels during operation, and of the brakes that stop the reel rotation, are also less stringent, such that the wire eroding machines can be produced less expensively. Further, the accuracy can be increased, since a lighter reel exhibits a lesser pull-back moment, or a reduced after-run, in the case of fluctuations in the downstream wire run-off and, consequently, wire oscillations can be reduced or, also, wire ruptures can be prevented. Alternatively, larger reels, having a greater wire length, can be realized, the reel weight remaining the same, such that the times between the cost-intensive and time-intensive reel changes can be increased, with an identical machine configuration.

In addition to designs having a homogeneous covering layer, it can also be advantageous to provide a covering layer that has a plurality of individual layers or sublayers, which are disposed over one another and of which each is made of at least 50% by weight of copper, zinc and/or a copper-zinc alloy. In this context, each of the sublayers, or partial layers, can have one of the compositions specified generally above for the covering layer. In particular, the sublayers can comprise one or more copper layers, one or more zinc layers and/or one or more copper-zinc alloy layers. For example, in an advantageous design, the covering layer could comprise an outer layer composed predominantly or entirely, or substantially entirely, of brass, and a thin copper layer between this outer layer and the core. Such a design could be realized, for example, in the manner already described above, that the core is first provided with a copper coating, a zinc layer is then applied to this copper coating, and finally a heat treatment is performed, in the course of which an outer brass layer is formed by diffusion, and a thin copper layer remains left over as a residue of the original copper coating. Such a copper layer has the advantage that disturbing influences such as, for example, increased brittleness or reduced adhesion, onto the transition layer between the core and the covering layer, resulting from penetration of elements of the covering layer, are reduced or prevented.

In further advantageous multilayer designs of the covering layer, one or more sublayers that comprise or are made of a γ phase can be combined with one or more sublayers that comprise or are made of an α phase and/or with one or more sublayers that comprise or are made of a β phase. For example, a design can be selected wherein the covering layer comprises or is composed of an outer layer of a zinc or copper-zinc alloy composed predominantly or entirely, or substantially entirely, of a γ phase and a layer of copper or of a copper-zinc alloy disposed between this outer layer and the core and composed predominantly or completely, or substantially completely, of α phase, as is disclosed, for example, in EP 0 733 431. Further, a design can be chosen in which the covering layer comprises or is composed of an inner sublayer that is composed predominantly or entirely, or substantially entirely, of β brass and an outer sublayer that is composed predominantly or entirely, or substantially entirely, of γ brass, as is disclosed, for example, in EP 1 295 664. Moreover, the above design of the covering layer can be realized with a brass having a zinc content of more than 40% by weight in such a manner, that this brass constitutes an outer sublayer of the covering layer and a sublayer of brass, having a zinc content of less than 40% by weight, is disposed between this outer sublayer and the core.

As aluminum alloys for the core, it is possible to use both non-hardenable alloys such as, for example, AlMg alloys (e.g. $AlMg_3$ or $AlMg_5$), and hardenable alloys such as, for example, AlMgSi alloys, AlCuMg alloys or AlZnMg alloys (e.g. $AlCuMg_1$, $AlCuMg_2$ or $AlZn_{4.5}Mg_1$). The latter offer the advantage that an improvement is achieved in the combination of conductivity and tensile strength. Preferably, aluminum alloys that are well suited for cold forming (wrought alloys) should be selected. The core can comprise one or more of these alloys, or be made of one or more of these alloys (i.e. one or more hardenable alloys and/or one or more non-hardenable alloys). With regard to recycling in the sense of a remelting, AlZnMgCu alloys in combination with a covering layer comprising only copper, zinc and/or brass can be advantageous, since the covering layer then does not contain any elements that go beyond the core.

The materials of the wire electrode are preferably selected such that the tensile strength of the wire electrode at room temperature is at least 350 N/mm$^2$. In the case of a core that comprises an aluminum alloy, this can be achieved already through an appropriate choice of the alloy. If pure aluminum is chosen as the core material, on the other hand, it must be taken into account that its tensile strength, including in the state hardened by cold forming, is less than the tensile strength of brass, and the covering layer must make a sufficient contribution to the total tensile strength of the electrode wire. In other words, the covering layer must then be constructed such that, overall, it achieves a higher tensile strength than the core in such a manner, that the total tensile strength of the wire is at least 350 N/mm$^2$.

In a preferred design, a transition layer is disposed between the core and the covering layer, which transition layer comprises one or more elements of the core material as well as one or more elements of the covering layer, and is preferably composed, or substantially composed, of these. In general, a corresponding transition layer will already be generated in the course of production of the wire electrode and, in particular, of the covering layer. In addition to, or instead of, such a production-related transition layer, one or more transition layers can be deliberately or selectively produced. The transition layer or the transition layers serves or serve to ensure a sufficiently strong bond between the core and the covering layer.

In a preferred design, the wire electrode has a diameter of at least 0.2 mm. The preferred upper limit is 0.4 mm. If a non-circular cross-section is chosen for the wire electrode, the specified value for the diameter relates to the minimum diameter. In this diameter range, the structure of the electrode wires according to the invention makes it possible to achieve particularly significant improvements in the economic efficiency with, at the same time, an efficient eroding process.

It is preferred that the structure of the wire electrode be selected such that its density is less than 5000 kg/m³, more preferably less than 4800 kg/m³, and most preferably less than 4300 kg/m³.

The invention is explained more fully in the following on the basis of exemplary embodiments, with reference to the drawing.

FIG. 1 shows, schematically and not true-to-scale, a cross-section of an embodiment of the wire electrode according to the invention.

The wire electrode 1 shown in cross-section in FIG. 1 has a core wire 2, which is completely encompassed, or surrounded, by a covering layer 3 that constitutes the outside of the wire electrode 1. A transition layer 4, which likewise completely encompasses, or surrounds, the core 2, is disposed between the covering layer 3 and the core 2. As has already been stated above, the covering layer 3 and/or the transition layer 4 can also be designed such that they have chinks or cracks or discontinuities, and do not completely cover the core.

In the exemplary embodiment represented, the core 2 is made homogeneously completely or substantially completely of crystalline aluminum or of a crystalline aluminum alloy. The covering layer 3 is likewise of a homogeneous and single-layer structure, and is made of more than 50% by weight, and preferably entirely or substantially entirely, of brass. For illustrative reasons, the transition layer 4 is represented with a greatly exaggerated thickness. In actual fact, it contributes only negligibly to the total cross-sectional area. It comprises at least one element that is present in the core 2, and at least one element that is present in the covering layer 3. Preferably, it comprises an alloy that, in its composition, is between that of the core 2 and that of the covering layer 3. In this regard, the composition can also vary in the radial direction, in order to effect a gradual transition between the core 2 and the covering layer 3. The transition layer 4 serves to improve the bond between the core 2 and the covering layer 3. Depending on the method used to produce the wire electrode 1, a more or less extensive transition layer will generally already be formed inherently, for example through diffusion processes. It must be pointed out that, overall, the boundary surfaces between adjacent layers are not normally realized in an ideal manner, but can be irregular and/or "indistinct" because of diffusion processes.

In a manner similar to the case of the transition layer 4, it can also be advantageous for the wire electrode 1 to be realized such that the composition of the core 2 and/or of the covering layer 3 varies in the radial direction. This can be achieved, not only through multilayer designs, but also through continuous variations.

The proportion of the area of the core 2 relative to the total cross-sectional area is at least 60%.

In a special, preferred example of this embodiment, the core 2 is made of pure aluminum and the covering layer 3 is made of $CuZn_{37}$. The transition layer 4 has a thickness of approximately one micrometer, and is composed substantially of alloys of aluminum and copper and/or zinc. The thickness of the wire electrode 1 is 0.25 mm, the proportion of the area of the core 2 relative to the cross-sectional area is 65%, and the tensile strength of the wire electrode 1 is 400 N/mm².

In a further special, preferred example of the embodiment represented in FIG. 1, the core 2 is made of the alloy $AlMg_3$ and the covering layer 3 is made of $CuZn_{45}$. The transition layer 4 has a thickness of approximately 15 μm, and is composed substantially of alloys of aluminum and copper and/or zinc. The thickness of the wire electrode 1 is 0.3 mm, the proportion of the area of the core 2 relative to the cross-sectional area is 65%, and the tensile strength of the wire electrode 1 is 400 N/mm².

The invention claimed is:

1. A wire electrode for cutting by electrical discharge machining, comprising:
    a core including at least one of pure crystalline aluminum or one or more crystalline aluminum alloys, wherein more than 50% by weight of the core is the at least one of pure crystalline aluminum or one or more crystalline aluminum alloys, and
    a covering layer that encompasses the core and comprises at least one of copper, zinc or a copper-zinc alloy,
    wherein, along the entire length of the wire electrode, the proportion of the area of the core relative to the entire cross-sectional area of the wire electrode is in the range from 60% to 95%.

2. The wire electrode of claim 1, wherein the core is made of a hardenable aluminum alloy.

3. The wire electrode of claim 2, wherein the hardenable aluminum alloy is an AlMgSi alloy, an AlCuMg alloy, an AlZnMg alloy or an AlZnMgCu alloy.

4. The wire electrode of claim 1, wherein the covering layer comprises brass having a zinc content of at least 40% by weight.

5. The wire electrode of claim 1, wherein the core is made of the at least one of pure crystalline aluminum or one or more crystalline aluminum alloys.

6. The wire electrode of claim 1, wherein the core is made of a non-hardenable aluminum alloy.

7. The wire electrode of claim 1, wherein at least 50% by weight of the covering layer is at least one of copper, zinc or a copper-zinc alloy.

8. The wire electrode of claim 1, wherein the covering layer has a plurality of sublayers, which are disposed over one another and of which at least 50% by weight of each sublayer is copper, zinc or a copper-zinc alloy.

9. The wire electrode of claim 1, wherein the tensile strength of the wire electrode at room temperature is at least 350 N/mm².

10. The wire electrode of claim 1, wherein one or more transition layers, which comprise one or more of the elements of the core and one or more of the elements of the covering layer, are disposed between the core and the covering layer.

11. The wire electrode of claim 1, wherein the diameter of the wire electrode is at least 0.2 mm.

12. The wire electrode of claim 1, wherein the density of the wire electrode is less than 5000 kg/m³.

\* \* \* \* \*

UNITED STATES PATENT AND TRADEMARK OFFICE
CERTIFICATE OF CORRECTION

PATENT NO. : 8,895,885 B2
APPLICATION NO. : 13/073541
DATED : November 25, 2014
INVENTOR(S) : Tobias Nöthe Page 1 of 1

It is certified that error appears in the above-identified patent and that said Letters Patent is hereby corrected as shown below:

On the title page, item (75), in "Inventor", in column 1, line 1, delete "Nothe" and insert --Nöthe--, therefor On page 2, in column 2, References Cited under "Other Publications", line 26, delete "Therrnocompact" and insert --Thermocompact--, therefor Signed and Sealed this
Third Day of November, 2015

Michelle K. Lee
*Director of the United States Patent and Trademark Office*